Feb. 25, 1941.  C. C. FARMER  2,232,907
FLUID PRESSURE BRAKE
Filed Sept. 29, 1939
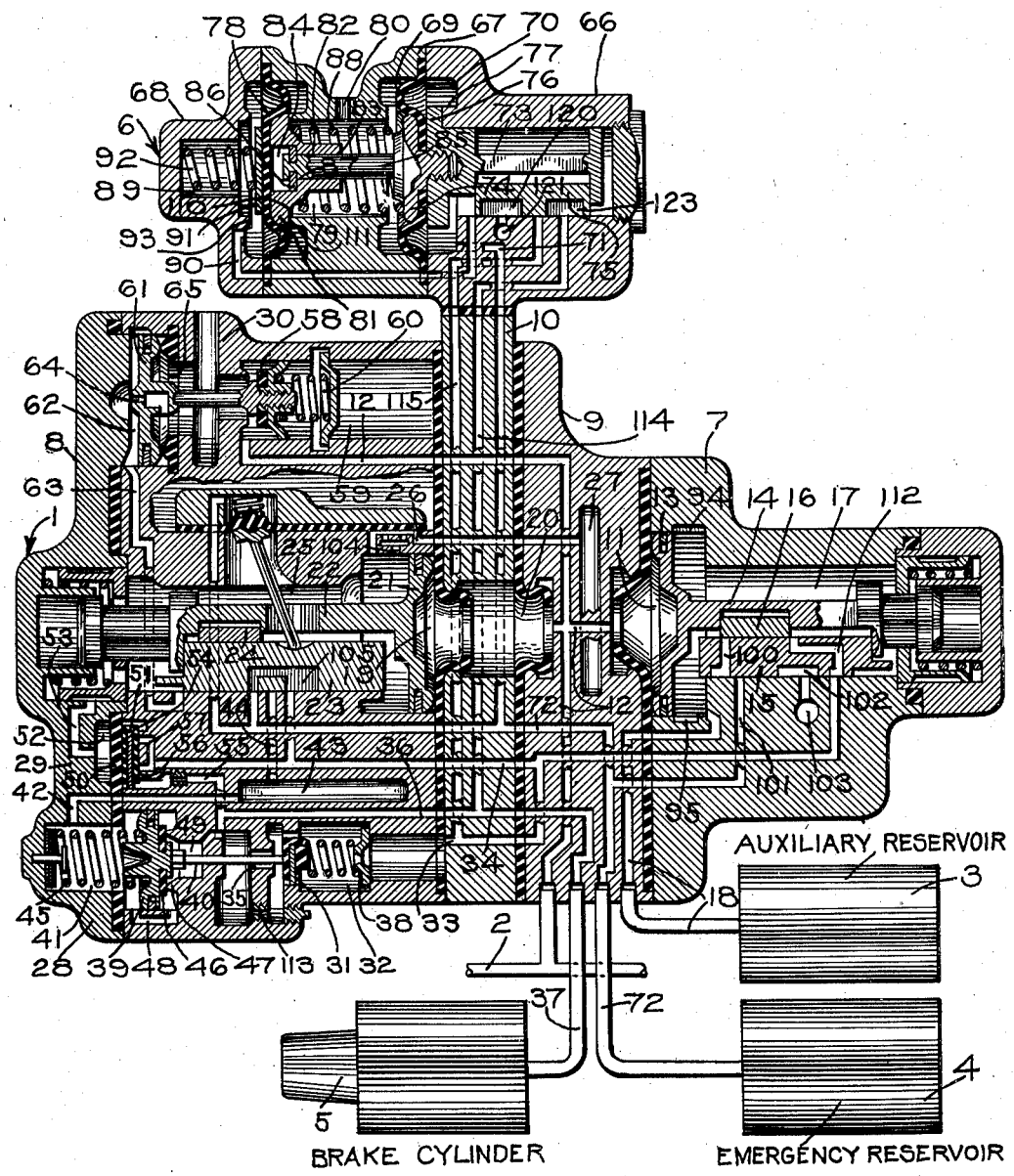
INVENTOR
CLYDE C. FARMER
BY
ATTORNEY Patented Feb. 25, 1941

2,232,907

UNITED STATES PATENT OFFICE 2,232,907

FLUID PRESSURE BRAKE

Clyde C. Farmer, Pittsburgh, Pa., assignor to The Westinghouse Air Brake Company, Wilmerding, Pa., a corporation of Pennsylvania Application September 29, 1939, Serial No. 297,122

19 Claims. (Cl. 303—23)

This invention relates to fluid pressure equipment of the type disclosed in the patent to Ellis E. Hewitt No. 2,159,797, issued May 23, 1939, which may be changed over or conditioned to meet the braking requirements of either freight or passenger train service, and relates more particularly to means for changing over or conditioning the equipment to function properly in the particular service in which it is employed.

Included in the above mentioned type of brake equipment is a brake cylinder build-up control valve mechanism which, when an emergency application of the brakes is being effected is adapted to function to first provide a limited initial inshot of fluid under pressure at a rapid rate to the brake cylinder to quickly apply the brakes with sufficient force to start the slack in the train to close or gather, and to then provide a slow build-up in brake cylinder pressure to insure the gentle gathering of the slack in the train, and lastly to provide a final rapid flow of fluid under pressure to the brake cylinder after the slack gathers which continues until the full emergency brake cylinder pressure is obtained. In a long train, such for instance as a train of a hundred cars or more, where there is considerable slack to gather, this control of brake cylinder pressure is very desirable in that it effectively prevents harsh gathering or closing of the slack and thereby prevents heavy damaging shocks from being created in the train.

On shorter trains, say for instance fifty cars or less, employed in fast freight service, where the trains are operated at high speed, the train slack will of course be materially less than on the longer trains and consequently the slack closing or gathering shocks in effecting an emergency application of the brakes, will be less in magnitude than on the longer trains. It therefore follows that the rate of build-up of brake cylinder pressure may be at a faster rate than on the longer trains. This fast rate of increase in the build-up of brake cylinder pressure on short trains is very desirable in that it insures prompt and safe emergency stops.

To meet these braking requirements the equipment includes manually operative means adapted to be conditioned to provide the desired rate of emergency build-up of brake cylinder pressure for either long or short trains. However, in order to insure that cars having such equipment applied thereto are properly conditioned for either long or short train operation, each car of each train must be inspected when the train is made up. Therefore, a brakeman must walk from one end to the other of each train and properly condition the equipment on each car so equipped. Due to neglect or carelessness, the equipment may be adjusted for long freight train service on a short train operated at high speed and in such event the rate of increase in brake cylinder pressure during an emergency application is too slow for the proper safe control of the brakes. On the other hand, if, on a long train, the equipment is conditioned for short train operation, harsh gathering or closing of the slack would occur during an emergency application of the brakes, which might result in heavy damaging shocks to the trains.

The principal object of the invention is to provide a fluid pressure brake equipment of the above mentioned type with a changeover valve device, which, when a car having such equipment applied thereto is placed in a train for a certain class of train service or is transferred from said train to a train in a different class of train service, will operate automatically to changeover or condition the equipment to provide the desired rate of emergency build-up of brake cylinder pressure for the particular class of train service in which the car is to be employed.

Another object of the present invention is to provide the above mentioned type of brake equipment with means for automatically rendering the brake cylinder pressure build-up control mechanism embodied therein either effective to control the rate of increase in brake cylinder pressure in effecting an emergency application of the brakes or for cutting additional build-up control means into operation to increase the rate of build-up in brake cylinder pressure.

A further object of the invention is to provide a fluid pressure brake of the above mentioned type having a brake cylinder communication which by-passes the brake cylinder pressure build-up control valve mechanism and which is adapted to be automatically opened or closed by means controlled according to the pressure to which the emergency reservoir is normally charged.

In the accompanying drawing the single figure is a diagrammatic view, mainly in section, of a fluid pressure brake equipment embodying the automatic means for conditioning the equipment for either long or short train operation, the several parts of the equipment being shown in emergency position and the conditioning means being shown in position to condition the equipment for long train operation.

As shown the brake equipment comprises a brake controlling valve device 1, a brake pipe 2, an auxiliary reservoir 3, an emergency reservoir 4, a brake cylinder 5 and a changeover valve device 6.

The brake controlling valve device 1 comprises an equalizing portion 7, an emergency portion 8 and a pipe bracket 9, the service and emergency portions being clamped to opposite sides of the pipe bracket. Associated with the control valve device 1 is an adapter or filler portion 10 which, in the present embodiment of the invention, is interposed between the pipe bracket 9 and the emergency portion 8, and carries the changeover valve device 6.

With the exception of the adapter or filler portion 10 and changeover valve device 6, the brake controlling valve device 1 may be identical in every respect with the corresponding device shown and described in the aforementioned Hewitt patent.

The equalizing portion 7 comprises a casing having a piston chamber 11 which is connected through a passage 12 to the brake pipe 2 and which contains a piston 13 having a stem 14 adapted to actuate a main slide valve 15 and an auxiliary slide valve 16 contained in a valve chamber 17 which is connected through a passage and pipe 18 to the auxiliary reservoir 3.

The emergency portion 8 may comprise a casing having a piston chamber 19 which is in constant communication with the brake pipe passage 12 by way of a passage 20 which is provided in the filler portion 10. Contained in chamber 19 is an emergency piston 21 having a stem 22 which is adapted to actuate a main slide valve 23 and an auxiliary slide valve 24 contained in a valve chamber 25 which is connected through a passage 26 to a quick action chamber 27 formed in the pipe bracket 9, which passage extends through the filler portion.

Associated with the emergency portion is a brake cylinder build-up control mechanism which comprises an inshot valve portion 28, and a timing or final inshot valve portion 29. Also associated with the emergency portion is a quick action vent valve device 30.

The inshot valve device comprises an inshot valve 31 which is contained in a chamber 32 having constant open communication with a passage 33 in the filler portion, which passage 33 is in registration with an application and release passage 34 leading to the seat for the equalizing main slide valve and also to the seat for the emergency slide valve and to the timing valve device, a portion of the passage 34 being formed in the filler portion 10. The valve 31 is operative to control communication through a passage 35 leading from the chamber 32 to a brake cylinder passage 36 which is connected to a pipe 37 leading to the brake cylinder, a portion of the passage 36 being formed in the filler portion 10. The chamber 32 is further connected to the passage 36 by way of a choked passage 113. Contained in the chamber 32 is a spring 38 which constantly biases the valve 31 in the direction toward its seat.

For controlling the operation of the valve 31 there is provided a piston 39 having a stem 40 which operatively engages the valve. At one side of this piston there is a chamber 41 which is connected through a passage 42, a small volume chamber 43 and a passage 44 to the seat for the emergency main slide valve. Contained in the chamber 41 and engaging the face of the piston is a spring 45 which has a greater pressure value than the spring 39 acting on the valve 31 in opposition to the spring 45. The rear face of the piston 39 is provided with a gasket 46 which is adapted to engage a valve seat 47 formed in the casing. This gasket is normally maintained in sealing engagement with seat 47 by the spring 45 acting through the medium of the piston, thus separating the outer seated area of the rear face of the piston from the inner seated area thereof. The outer seated area of the piston is connected through a passage 48 to the piston chamber 41 and the inner seated area is exposed to a chamber 49 which is in constant communication with the brake cylinder passage 36.

The timing or inshot valve 29 comprises a flexible diaphragm 50 and a timing or inshot valve 51, which valve is under the control of the flexible diaphragm. At one side of this diaphragm is a chamber 52 which is connected through a passage 53 to the emergency valve chamber 25, and at the other side of the diaphragm is a chamber 54 which is connected through a choke passage 55 to the brake cylinder passage 36 and which contains the valve 51. The valve is adapted to engage a valve seat 56 which is formed on the casing and when so seated the inner area thereof is exposed to a chamber 57 which is in constant communication with the passage 34.

The quick action vent valve device may be identical with the corresponding vent valve device shown in the aforementioned Hewitt patent and in view of this will only be briefly described here. As shown this device comprises a quick action vent valve 58 which is contained in a chamber 59 constantly open to the brake pipe passage 12 and which is normally maintained seated by the action of a spring 60 contained in the chamber. The operation of the valve 58 is controlled by a piston 61 which is contained in a piston chamber 62 connected through a passage 63 to the seat for the emergency main slide valve. The quick action piston is provided with a vent port 64 of small diameter which connects the chamber 62 to a chamber 65 constantly open to the atmosphere.

The automatic changeover valve device 6, which is employed for the purpose of conditioning the equipment to provide the desired rate of emergency build-up of brake cylinder pressure for either long or short train operation, comprises a casing which is secured to the adapter or filler portion 10 in any desired manner. The casing of this valve device 10 preferably comprises sections 66, 67 and 68, the sections 66 and 68 being respectively secured to opposite sides of section 67 and the section 66 is secured to portion 10.

Operatively mounted in the casing is a movable abutment which in the present embodiment of the invention is in the form of a flexible diaphragm 69 which is clamped between the casing sections 66 and 67. At one side of this diaphragm there is a chamber 70 which is connected, through a passage 71 and a passage and a pipe 72 to the emergency reservoir 4. Contained in the chamber 70 is a stem 73 to which the diaphragm 69 is clamped by means of a follower 74 having screw-threaded connection with the stem 73. The stem being thus connected to the follower is operative by the diaphragm 69 to control the movement of a control slide valve 75 also contained in the chamber 70. The stem 73 is provided with a stop flange 76 which is adapted to engage a stop shoulder 77 formed on the casing section 66 for limiting the movement of the diaphragm 69 and thereby the stem 73 and slide valve 75 in the direction toward the right hand.

Clamped between the casing sections 67 and 68 is a movable abutment in the form of a flexible diaphragm 78. The diaphragms 69 and 78 together with the casing define a chamber 79 which is constantly connected to a passage 80 leading to the atmosphere. Contained in this chamber and operatively engaging the face of the diaphragm 78 is a diaphragm follower 81 provided with a central projection 82 having a central bore 83 and a counterbore 84 open to the diaphragm engaging face of the follower.

The follower 74 is provided with a longitudinally extending stem 85 which is slidably guided in the bore 83. The end of the stem extends into the counterbore 84 and has secured thereto a collar or stop ring 86 having a snug sliding fit with the wall of the counterbore. This ring is adapted to engage with a stop shoulder 87, formed at the juncture of the bore and counterbore, to limit longitudinal movement of the stem in the direction toward the right hand, as viewed in the drawing. Between the end of the stem and the diaphragm 78 a slight clearance space is provided for the purpose of permitting, as will hereinafter more fully appear, longitudinal movement of the stem relative to the follower in a direction toward the left hand, as viewed in the drawing.

Contained in the chamber 79 and interposed between and operatively engaging the followers 74 and 81 is a spring 88 which, as will hereinafter more fully appear, is adapted to yieldably resist movement of the follower 74 and thereby the stem 73 and slide valve 75 in the direction toward the diaphragm 78.

At the outer face of the diaphragm 78 is a chamber 89 which is open to a passage 90 leading to the seat for the control slide valve 75. Contained in this chamber is a diaphragm follower 91 and a coil spring 92. The spring 92 is interposed between and operatively engages the diaphragm follower 91 and an inner surface of the adjacent end wall of the chamber 89, which spring tends at all times to urge the diaphragm and spring assembly and associated slide valve 75 toward the right as shown in the drawing. This end wall of the chamber 89 is provided with an annular rib 93 adapted to engage with the diaphragm 78 to limit the movement of the diaphragm 78 in the direction of the spring 92.

In the present embodiment of the invention, the operation of the changeover valve mechanism to condition the equipment for either standard freight, express or fast freight train service depends upon the pressure of fluid normally carried in the brake pipe and consequently in emergency reservoir 4. In standard freight train service the emergency reservoir is charged with fluid at the usual pressure of about seventy pounds from the brake pipe in fast freight or express service it is the usual practice to charge the brake pipe and consequently the emergency reservoir to a pressure higher than seventy pounds, say for instance, to ninety or more pounds.

*Standard freight service*

In initially charging the equipment for use in standard freight train service, fluid under pressure is supplied to the brake pipe 2 in the usual and well known manner. From the brake pipe, fluid under pressure flows through a branch pipe and passage 12 to the equalizing piston chamber 11, chamber 20 in the follower portion 10 and consequently to the emergency piston chamber 19, and also flows to the quick action vent valve chamber 59.

With the equalizing piston 13 in release position fluid under pressure flows from the piston chamber 11 through feed grooves 94 and 95 to the equalizing valve chamber 17, and from thence flows through passage and pipe 18 to the auxiliary reservoir 3. From the chamber 17 fluid under pressure flows to the emergency reservoir 4 by way of a port 100 in the main slide valve 15, a passage 101 and passage and pipe 72.

Fluid under pressure supplied to passage 72 besides flowing to the emergency reservoir, also flows through the branch passage 71 to the valve chamber 70 of the changeover valve device. From the chamber 70 fluid under pressure flows through passage 90 to the diaphragm chamber 89. Since the pressure of fluid in the chambers 70 and 89 build-up together the spring 92, acting through the medium of the diaphragm 78, follower 81, spring 88 and follower 74 will maintain the valve 75 in the position in which it is shown in the drawing, the spring 88 being of such a value that it will prevent flexing of the diaphragm 69 toward the left as long as the pressure in chamber 70 does not exceed seventy pounds. With the changeover valve device in this position the inner surface 110 of the follower 81 is engaged by a stop lug 111 formed on the casing section 67 and movement of the diaphragm 78 and associated follower 81 to the right is thereby prevented.

With the equalizing main slide valve in release position the brake cylinder 5 is open to the atmosphere by way of pipe 37, passage 36, passage 35 in the inshot valve device, inshot valve chamber 32, passages 33 and 34, a cavity 102 in the equalizing main slide valve 15 and a passage 103.

With the emergency piston 21 in release position, fluid under pressure being supplied to the emergency piston chamber 19 flows through a small port 104 to the passage 26 and from thence flows to the quick action chamber 27 and the emergency slide valve chamber 25. From the chamber 25 fluid under pressure flows through passage 53 to the diaphragm chamber 52 of the timing valve device 29, the pressure of fluid in chamber 52 acting on the diaphragm 50 to maintain the timing valve 51 seated on the seat rib 56. With the emergency main slide valve 23 in release position the piston chamber 41 of the inshot valve device is connected to the atmosphere by way of passage 42, chamber 43, passage 44, a cavity 105 in the slide valve 23 and passage 34. Even though the chamber 41 is thus connected to the atmosphere the spring 45 acts to maintain inshot valve 31 open against the opposing pressure of the spring 38.

From the foregoing description of the charging of the equipment, it will be seen that the brakes are released and that the equipment is fully charged to its normal pressure with fluid.

When it is desired to effect an emergency application of the brakes, an emergency reduction in brake pipe pressure is effected in the usual well known manner which causes the several parts of the equalizing portion and the emergency portion to move to the position in which they are shown in the drawing.

With the equalizing piston 13 and slide valves 15 and 16 assocated therewith in this position, fluid under pressure flows from the auxiliary reservoir 3 to the inshot valve chamber 32 by way of pipe and passage 18 equalizing valve chamber 17, a port 112 in the main slide valve 15 and passages 34 and 33. Fluid under pressure thus supplied to passage 34 also flows therefrom to a passage 115 in the filler portion 10, to the seat for the control slide valve 75 of the changeover valve device 6, which passage is maintained closed, with the slide valve in the position shown in the drawing.

With the emergency piston 21 and associated slide valves 23 and 24 in emergency position, fluid under pressure flows from the emergency reservoir 4 and connected diaphragm chambers 70 and 89 to the inshot valve chamber 32 of the inshot valve device 28. The communication from the emergency reservoir is made by way of pipe and passage 72, cavity 105 in the emergency main slide valve 23 and passages 34 and 33, and from the chambers 89 and 70 by way of passage 71 to passage 72, so that the changeover valve device is maintained in the position shown.

Fluid under pressure thus suppled to the chamber 32 flows past inshot valve 31 through passage 35, passage 36 and pipe 37 to the brake cylinder 5. Fluid under pressure thus supplied to passage 36 also flows to a passage 114 in the filler portion 10 which passage leads to the seat for the slide valve in the changeover valve device 6 and which is lapped in this position of the changeover valve device. Now when the brake cylinder pressure has been increased sufficiently to cause the usual brake shoes to engage the wheels so as to start the slack in the train to gather or close, the piston 39 of the inshot valve device will be caused to move toward the left against the opposing pressure of the spring 45 and as a result of such movement the spring 38 causes the valve 31 to seat and thus cut off communication from the valve chamber 32 to the passage 36 by way of the passage 35. With the passage 35 closed fluid under pressure flows from chamber 32 to the passage 36 and consequently to the brake cylinder by way of the restricted passage 113, and the flow of fluid from chamber 32 to the passage 36 is governed according to the flow area of the restricted passage 113.

With the emergency slide valve 23 of the emergency valve device in emergency position fluid under pressure flows from the emergency valve chamber 25 and connected quick action chamber 27 through passage 63 to the quick action piston chamber 62 causing said piston to move inwardly and unseat the vent valve 58 against the opposing action of the spring 60. With the vent valve unseated fluid under pressure is vented from the brake pipe to the atmosphere by way of passage 12 and past the open vent valve 58. Fluid under pressure supplied to the quick action piston chamber 62 flows through port 64 in the piston to the atmosphere thus the pressure of fluid in the emergency piston chamber 25 and quick action chamber 27 is reduced to atmospheric pressure. Now when the increasing brake cylinder pressure present in chamber 54 and 57 of the timing valve device becomes slightly greater than the reducing quick action chamber pressure present in chamber 52, the flexible diaphragm 50 will flex outwardly and permit the timing valve 51 to unseat. With the timing valve unseated fluid under pressure flows from the passage 34 through restricted passage 55, passage 36 and pipe 37 to the brake cylinder thus accelerating the rate of increase in brake cylinder pressure over that which would be obtained by the flow of fluid through passage 113.

From the foregoing it will be understood that when a car equipped with a fluid pressure brake equipment embodying the invention is in standard freight train service the means for controlling the rate of build-up in brake cylinder pressure in effect an emergency application of the brakes does not change or does not modify any of the other operating characteristics of the brake equipment.

*Fast freight or express service*

As before mentioned when the equipment is employed in fast freight or express train service, it is the usual practice to change the brake pipe and consequently the emergency reservoir to about ninety pounds although if desired this pressure may be higher.

Under these conditions when it is desired to initially charge a car equipment with a fluid pressure brake equipment embodying the invention fluid under pressure supplied to the brake pipe flows to the auxiliary and emergency reservoirs in substantially the same manner as described under charging a car in standard freight service.

Now, as before described, fluid under pressure supplied to the emergency reservoir flows to the diaphragm chambers 70 and 89 of the changeover valve device 6. When the pressure thus supplied to chamber 70 acting on the face of diaphragm 69 increases to a predetermined degree about seventy pounds, the diaphragm 69 is caused to flex inwardly relative to the diaphragm 78, that is in the direction toward the left hand against the opposing pressure of the spring 88, thus shifting the stem 73, associated slide valve 75, diaphragm follower 74 and follower stem 83 in the same direction. The movement of the diaphragm 69, stem 73, slide valve 75, follower 74 and follower stem 83 continues until the cavity 120 in the slide valve 75 connects the passage 90 to the atmospheric passage 121 so that fluid under pressure is now vented from the diaphragm chamber 89. Upon the venting of fluid from chamber 89, the compressed spring 88 acts to cause the diaphragm 78 to flex in the direction toward the left hand against the lighter opposing pressure of the spring 92. Fluid at emergency reservoir pressure present in chamber 70 continues to flex the diaphragm 69 toward the left thereby shifting the slide valve 75 further to the left to its full changeover position in which the atmospheric communication from the diaphragm chamber 89 is maintained and in which the cavity 123 in the slide valve 75 connects passages 114 and 115. Since the passage 115 is connected to the brake cylinder passage 33 at a point located between the passage 34 and the brake cylinder build-up control mechanism and the passage 114 is connected to the brake cylinder passage 36 at a point located between the brake cylinder build-up control mechanism and the brake cylinder, a by-pass communication is established through which fluid under pressure is adapted to flow to the brake cylinder independently of the brake cylinder build-up control mechanism.

It will here be noted that with the several parts of the changeover valve device in their full changeover position, the follower 81 is in abutting engagement with the stop ring 86 so that the force of the spring is no longer effective on either the diaphragm 69 or the diaphragm 78. These parts of the change-over valve device will now remain in their full change-over position until such time as the emergency reservoir pressure is reduced to a value less than that of the spring 92.

With the equipment fully charged and the change-over valve device in its full change-over position, as just described, and a reduction in brake pipe pressure at an emergency rate is made to effect an emergency application of the brakes, the equalizing and emergency pistons 13 and 21 and associated slide valves 15, 16 and 23 and 24, respectively, assume their respective application positions, as shown in the drawing. In this position the equalizing main slide valve 15 establishes communication through which fluid under pressure from the auxiliary reservoir flows to passage 34 and in which position the emergency main slide valve 23 establishes communication through which fluid under pressure flows from the emergency reservoir to passage 34, as described under standard freight train service.

With the change-over valve 6 positioned for fast freight or express service, fluid under pressure thus supplied to passage 34 by-passes the brake cylinder build-up control mechanism and flows to the brake cylinder 5 thereby providing the rapid straight away build-up of brake cylinder pressure regardless of the brake cylinder build-up control mechanism. The communication through which the fluid by-passes the brake cylinder build-up control mechanism is established by way of passage 33, passage 115, cavity 123 in the slide valve 75, passage 114, passage 36 and pipe 37. With the communication established it is obvious that the operation of the brake cylinder build-up control valve mechanism will have no effect upon the rate of build-up of brake cylinder pressure.

From the foregoing it will now be evident that the change-over valve device 6 automatically operates depending upon the pressure carried in the brake equipment and more particularly in the emergency reservoir thereof to condition the equipment for either a straight away rapid build-up or a controlled build-up of brake cylinder pressure during an emergency application of the brakes.

When a car is to be transferred from a train which is being used in fast freight or express train service to a train to be used in standard freight service the emergency reservoir pressure is reduced, by use of the usual reservoir release valve device (not shown), to substantially atmospheric pressure. When the pressure is thus reduced, the previously compressed spring 92 acts to shift the several movable parts of the change-over valve device back to the positions in which they are shown in the drawing, thus conditioning the equipment for standard freight train service.

The change-over valve device 6 for controlling the rate of build-up in brake cylinder pressure in effecting an emergency application of the brakes does not materially change or modify any of the other operating characteristics of the brake equipment, and in view of this a description of the brake equipment in its other control positions is deemed unnecessary.

While one illustrative embodiment of the invention has been described in detail, it is not my intention to limit its scope to this embodiment or otherwise than by the terms of the appended claims.

Having now described my invention, what I claim as new and desire to secure by Letters Patent, is:

1. A fluid pressure brake system for use in a plurality of classes of train service and adapted to be normally charged with fluid at a different pressure for each class of train service, in combination, a brake cylinder, a brake controlling valve device operative in each of said classes of train service to supply fluid under pressure to the brake cylinder to effect an application of the brakes, valve means operative to control the rate of increase in brake cylinder pressure for one of said classes of train service, and a valve device adapted to establish a by-pass communication around said valve means through which fluid is adapted to be supplied to the brake cylinder independently of the operation of said valve means, said valve device being operative upon charging the system above a predetermined degree to open said by-pass communication and thereby render said valve means ineffective to control the rate of increase in brake cylinder pressure, said valve device being adapted to maintain said by-pass communication closed to render said valve means effective to control the rate of increase in brake cylinder pressure so long as the pressure in the system has not previously been increased to said predetermined degree.

2. A fluid pressure brake equipment for use in a plurality of classes of train service and adapted to be normally charged with fluid at a different pressure for each class of train service, in combination, an emergency reservoir included in said equipment, a brake cylinder and a brake controlling valve device operative in each of said classes of train service to supply fluid under pressure from said reservoir to said brake cylinder to effect an emergency application of the brakes, valve means operative to control the rate of increase in brake cylinder pressure for one of said classes of service, and a changeover valve device separate from said valve means comprising a movable abutment adapted to establish a by-pass communication through which fluid is adapted to be supplied to the brake cylinder independently of the operation of said valve means, said abutment being operative upon charging the reservoir above a predetermined degree to open said by-pass communication and thereby render said valve means ineffective to control the rate of increase in brake cylinder pressure, said abutment being adapted to maintain said by-pass communication closed so long as the pressure in the system has not previously been increased to said predetermined degree.

3. In a fluid pressure brake equipment comprising an emergency reservoir adapted to be normally charged with fluid under pressure, a brake cylinder and a brake controlling valve device of the type operative to regulate the rate of flow of fluid supplied from the emergency reservoir to the brake cylinder during an emergency application of the brakes to that suitable for long train operation, in combination, a change-over valve device including a valve for controlling a by-pass to provide for the acceleration of the rate of flow of fluid from the emergency reservoir to the brake cylinder to thereby accelerate the rate of build-up of brake cylinder pressure to adapt the brake equipment for short train operation, said valve being operative independently of the operation of the brake controlling valve device upon charging the reservoir above a predetermined degree to open said by-pass to permit a supply of fluid under pressure to the brake cylinder and thereby render the brake controlling valve device ineffective to control the rate of flow of fluid to the brake cylinder and adapted upon initially charging the equipment to a pressure below said predetermined degree to maintain said by-pass closed and thereby render said brake control valve device effective to control the rate of flow of fluid to the brake cylinder.

4. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, means operative to render said valve means ineffective to vary the rate of increase in brake cylinder pressure, said means comprising a valve having one position in which said valve means is effective to vary the rate of increase in brake cylinder pressure and having another position in which said valve means is ineffective to vary the rate of increase in brake cylinder pressure, a movable abutment subject to the opposing pressures of the fluid in said reservoir and a spring and operative upon a predetermined increase in the pressure of fluid in the reservoir to move said valve to said other position, and means operative when said valve is in said other position for relieving the abutment of the pressure of said spring.

5. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, a changeover valve device operative to render said valve means ineffective to vary the rate of increase in brake cylinder pressure, said changeover valve device comprising a slide valve having one position in which said valve means is effective to vary the rate of increase in brake cylinder pressure and having another position in which said valve means is ineffective to vary the rate of increase in brake cylinder pressure, a movable abutment for actuating said slide valve, said abutment being movable to actuate said valve from said one position to said other position upon a predetermined increase in the pressure of the fluid in the reservoir, a spring adapted to yieldable resist movement of said abutment and means operative upon movement of said valve from said one position to said other position for relieving the abutment of the pressure of said spring.

6. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, means operative to render said valve means ineffective to vary the rate of increase in brake cylinder pressure, said means comprising a valve having one position in which said valve means is effective to vary the rate of increase in brake cylinder pressure and having another position in which said valve means is ineffective to vary the rate of increase in brake cylinder pressure, a movable abutment subject to the opposing pressures of the fluid in said reservoir and a spring and operative upon a predetermined increase in the pressure of fluid in the reservoir to move said valve to said other position, and means subject to fluid under pressure when the valve is in said one position for rendering said spring effective to oppose movement of the abutment, said abutment being relieved of the pressure of the spring upon venting of fluid under pressure from said means, and means in said valve establishing a communication through which fluid under pressure is vented from the means subject to fluid under pressure when said valve is in said other position.

7. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, means operative to render said valve means ineffective to vary the rate of increase in brake cylinder pressure, said means comprising a valve having one position in which said valve means is effective to vary the rate of increase in brake cylinder pressure and having another position in which said valve means is ineffective to vary the rate of increase in brake cylinder pressure, a movable abutment subject to the opposing pressures of the fluid in said reservoir and a spring and operative upon a predetermined increase in the pressure of fluid in the reservoir to move said valve to said other position, and another abutment subject to fluid under pressure when said valve is in said one position for rendering said spring effective to oppose movement of the first mentioned abutment, said other abutment being operative upon venting of fluid under pressure therefrom for relieving the first mentioned abutment of the pressure of said spring upon movement of said valve to said other position.

8. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, means operative to render said valve means ineffective to vary the rate of increase in brake cylinder pressure, said means comprising a valve having one position in which said valve means is effective to vary the rate of increase in brake cylinder pressure and having another position in which said valve means is ineffective to vary the rate of increase in brake cylinder pressure, a movable abutment subject to the opposing pressures of the fluid in said reservoir and a spring and operative upon a predetermined increase in the pressure of fluid in the reservoir to move said valve to said other position, and fluid pressure responsive means operative for rendering said spring effective or ineffective to oppose movement of said abutment and adapted to be controlled by said valve upon said predetermined increase in the reservoir pressure to render said spring ineffective to oppose movement of said abutment.

9. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, means operative to render said valve means ineffective to vary the rate of increase in brake cylinder pressure, said means comprising a valve having one position in which said valve means is effective to vary the rate of increase in brake cylinder pressure and having another position in which said valve means is ineffective to vary the rate of increase in brake cylinder pressure, a movable abutment subject to the opposing pressures of the fluid in said reservoir and a spring and operative upon a predetermined increase in the pressure of fluid in the reservoir to move said valve to said other position, and means subject to fluid under pressure for rendering said spring effective to oppose movement of said abutment and valve from said one position to said other position and rendered ineffective to oppose the movement of the abutment and valve upon the venting of fluid under pressure therefrom, means in said valve for establishing a communication through which fluid under pressure is supplied to said first mentioned means when the valve is moved to said one position, and means in said valve for establishing a communication through which fluid under pressure is vented from said first mentioned means upon said predetermined increase in said reservoir pressure.

10. A fluid pressure brake equipment for use in a plurality of classes of train service and adapted to be normally charged with fluid at a different pressure for each class of train service and having a reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an application of the brakes, and valve means automatically operative to vary the rate of increase in brake cylinder pressure, in combination, a changeover valve device operative to render said valve means ineffective to vary the rate of increase in brake cylinder pressure, said changeover valve device comprising a slide valve having one position in which said valve means is effective to vary the rate of increase in brake cylinder pressure and having another position in which said valve means is ineffective to vary the rate of increase in brake cylinder pressure, a movable abutment for actuating said slide valve, said abutment being movable to actuate said valve from said one position to said other position upon a predetermined increase in the pressure of the fluid in the reservoir, a spring adapted to yieldable resist movement of said abutment, and fluid pressure means for rendering said spring effective or ineffective to oppose movement of the abutment, said fluid pressure means being adapted to be controlled by said valve and operative upon said increase in pressure in the reservoir to operate said fluid pressure means to render said spring ineffective to oppose the movement of said abutment.

11. A fluid pressure brake equipment for use in a plurality of classes of train service and adapted to be normally charged with fluid at a different pressure for each class of train service, in combination, an emergency reservoir included in said equipment, a brake cylinder and a brake controlling valve device operative in each of said classes of train service to supply fluid under pressure from said reservoir to said brake cylinder to effect an emergency application of the brakes, valve means automatically operative to control the rate of increase in brake cylinder pressure, a valve having a first position for rendering said valve means effective and a second position for rendering said valve means ineffective, and a movable abutment for actuating said valve, said abutment being movable to actuate said valve from said first to said second position upon a predetermined increase in emergency reservoir pressure, a spring adapted to yieldably resist movement of said abutment, another abutment subject to fluid under pressure for rendering said spring effective to oppose movement of said first mentioned abutment for actuating said valve from said first to said second position, said spring being rendered ineffective to oppose movement of said first mentioned abutment upon the venting of fluid under pressure from said other abutment, means in said valve for establishing a communication through which fluid under pressure is supplied from said reservoir to said other abutment when said valve is in said first position, and means in said valve for establishing a communication through which fluid under pressure is vented from said other abutment upon said predetermined increase in emergency reservoir pressure.

12. A fluid pressure brake equipment for use in a plurality of classes of train service and adapted to be normally charged with fluid at a different pressure for each class of train service and having an emergency reservoir normally charged with fluid to the normal pressure to which the equipment is charged in any particular class of train service, a brake cylinder, a brake controlling valve device operative in each of said classes of train service to supply fluid under pressure from said reservoir to said brake cylinder to effect an emergency application of the brakes, valve means adapted to be automatically operative to control the rate of increase in brake cylinder pressure, in combination, a valve having a first position for rendering said valve means effective and a second position for rendering said valve means ineffective and a movable abutment for actuating said valve, and means for opposing movement of said abutment and valve from said first to said second position until the emergency reservoir pressure is increased to a predetermined degree, said means comprising a spring adapted to yieldably resist movement of said abutment, and a flexible diaphragm movable into a position for rendering said spring effective to oppose movement of said abutment and valve upon the supply of fluid pressure on one side of said diaphragm and movable to another position for rendering said spring ineffective to oppose movement of said abutment and valve to said second position upon the venting of fluid from said side of the diaphragm, and means included in said valve for controlling the supply of fluid to and the release of fluid from said side of the diaphragm.

13. In a fluid pressure brake equipment for use in a plurality of classes of train service and adapted to be normally charged with fluid at a different pressure for each class of train service, in combination, a brake controlling valve device operative in each of said classes of train service to supply fluid under pressure to the brake cylinder to effect an application of the brakes, valve means operative to control the rate of increase in brake cylinder pressure for one of the said classes of train service, other valve means automatically operative according to the pressure to which the equipment is charged and independently of the operation of the first mentioned valve means for by-passing fluid under pressure around the first mentioned valve means to the brake cylinder to thereby render the valve means ineffective to control the rate of increase in brake cylinder pressure.

14. In a fluid pressure brake equipment for use in a plurality of classes of train service and adapted to be normally charged with fluid at a different pressure for each class of train service, in combination, a brake controlling valve device operative in each of said classes of train service to supply fluid under pressure to the brake cylinder to effect an application of the brakes, valve means operative to control the rate of increase in brake cylinder pressure for one of the said classes of train service, and other valve means operative upon charging the equipment above a predetermined degree and independently of the operation of the first mentioned valve means for by-passing fluid under pressure around the first mentioned valve means to the brake cylinder to thereby render the valve means ineffective to control the rate of increase of brake cylinder pressure and adapted to cut-off said by-pass and thereby render said first mentioned valve means effective to control the rate of increase when the equipment is charged to a lesser degree.

15. In a fluid pressure brake equipment for use in a plurality of classes of train service and adapted to be normally charged with fluid at a different pressure for each class of train service, in combination, an emergency reservoir included in said equipment, a brake cylinder and a brake controlling valve device operative in each of said classes of train service to supply fluid under pressure from said emergency reservoir to said brake cylinder to effect an emergency application of the brakes, valve means automatically operative to control the rate of increase in brake cylinder pressure, a valve having one position for establishing a communication independently of said valve means through which communication fluid under pressure by-passes the valve means and flows to the brake cylinder at an uncontrolled rate to thereby render the valve means ineffective to control the rate of increase in brake cylinder pressure and another position for disestablishing said communication to cut off the flow of fluid under pressure at said uncontrolled rate to the brake cylinder to thereby render said valve means effective and means constantly subject to emergency reservoir pressure and operative according to the pressure to which the reservoir is charged for positioning said valve.

16. In a fluid pressure brake equipment for use in a plurality of classes of train service and adapted to be normally charged with fluid at a different pressure for each class of train service, in combination, an emergency reservoir included in said equipment, a brake cylinder and a brake controlling valve device operative in each of said classes of train service to supply fluid under pressure from said emergency reservoir to said brake cylinder to effect an emergency application of the brakes, valve means automatically operative to control the rate of increase in brake cylinder pressure, and other valve means responsive to the pressure of fluid in the emergency reservoir and independently of the operation of the first mentioned valve means for in another of said classes of service to by-pass fluid under pressure around the first mentioned valve means to the brake cylinder to thereby render the valve means ineffective to control the rate of increase in brake cylinder pressure.

17. In a fluid pressure brake equipment for use in a plurality of classes of train service and adapted to be normally charged with fluid at a different pressure for each class of train service, in combination, an emergency reservoir included in said equipment and normally charged with fluid at the pressure carried in the equipment, a brake cylinder and a brake controlling valve device operative in each of said classes of train service to supply fluid under pressure from said reservoir to the brake cylinder to effect an emergency application of the brakes, valve means automatically operative to control the rate of increase in brake cylinder pressure in one of said classes of train service, and means separate from the valve means responsive to the pressure of fluid in the emergency and independently operative when, in another of said classes of service, the emergency reservoir is charged to a pressure in excess of that required for the first mentioned class of service, for by-passing fluid under pressure around the valve means to the brake cylinder to thereby render said valve means ineffective to control the rate of increase in brake cylinder pressure.

18. In a fluid pressure brake equipment for use in a plurality of classes of train service and adapted to be normally charged with fluid at a different pressure for each class of train service, in combination, an emergency reservoir included in said equipment and normally charged with fluid at the pressure carried in the equipment, a brake cylinder and a brake controlling valve device operative in each of said classes of train service to supply fluid under pressure from said reservoir to the brake cylinder to effect an emergency application of the brakes, valve means automatically operative to control the rate of increase in brake cylinder pressure in one of said classes of train service, and means independently of the operation of the valve means and responsive to the pressure of fluid in the emergency reservoir when, in another of said classes of service, the emergency reservoir is charged to a pressure in excess of that required for the first mentioned class of service to by-pass fluid under pressure around the valve means to the brake cylinder to thereby render said valve means ineffective to control the rate of increase in brake cylinder pressure, said means being automatically operative to cut-off said by-pass to again render said valve means effective upon a subsequent reduction in emergency reservoir pressure to or below that required in the first mentioned class of service.

19. In a fluid pressure brake system for use in a plurality of classes of train service and adapted to be normally charged with fluid at a different pressure for each class of train service, in combination, a brake cylinder, a brake controlling valve device operative in each of said classes of train service to supply fluid under pressure to the brake cylinder to effect an application of the brakes, valve means operative to control the rate of increase in brake cylinder pressure for one of said classes of train service, and a valve separate from and independently operative of said valve means responsive to the pressure of fluid in the system and automatically operative according to the pressure to which the system is normally charged in another of said classes of service for by-passing fluid under pressure around the valve means to the brake cylinder to thereby render said valve ineffective to control the rate of increase in brake cylinder pressure.

CLYDE C. FARMER.